United States Patent [19]

Jacob et al.

[11] Patent Number: 4,679,431

[45] Date of Patent: Jul. 14, 1987

[54] PROBE ASSEMBLIES INCLUDING SUCH MOUNTS

[75] Inventors: Neil R. Jacob; John R. Suiter, both of Basingstoke, England

[73] Assignee: Smiths Industries Public Limited Company, London, England

[21] Appl. No.: 836,670

[22] Filed: Mar. 5, 1986

[30] Foreign Application Priority Data

Mar. 15, 1985 [GB] United Kingdom ............... 8506716

[51] Int. Cl.⁴ ..................... G01F 23/00; G01F 23/26
[52] U.S. Cl. .................... 73/290 R; 73/304 R; 73/430; 361/304
[58] Field of Search ............... 73/304 C, 432 B, 430; 361/284

[56] References Cited

U.S. PATENT DOCUMENTS

| | | | |
|---|---|---|---|
| 3,543,568 | 12/1970 | Russell | 73/855 X |
| 3,909,713 | 9/1975 | Billeter | 73/855 X |
| 4,324,503 | 4/1982 | Sevrence | 403/197 |
| 4,551,785 | 11/1985 | Kroner | 361/284 |
| 4,562,733 | 1/1986 | Kant | 73/304 C |

FOREIGN PATENT DOCUMENTS 382382 10/1932 United Kingdom .
635306 4/1950 United Kingdom .

*Primary Examiner*—Daniel M. Yasich
*Attorney, Agent, or Firm*—Pollock, Vande Sande and Priddy

[57] ABSTRACT

A capacitance fuel-gauging probe is supported at its upper end in a fuel tank by a stress-relieving mount. The mount includes a disc assembly formed of two identical steel discs each with a central aperture. The discs are joined together at their respective outer edges and around their respective central apertures by steel rings which separate the discs from one another, forming an annular recess. The ratio of the estimated disc stress to the disc material proof stress, and the ratio of the estimated probe stress to the probe material proof stress are substantially the same and as small as possible. A bolt extends through the aperture, the probe being clamped to the center of the disc assembly by a nut. The outer edge of the disc assembly is clamped securely with the wall of the fuel tank by a collar screwed into a sleeve within which the disc assembly is located. Any vibration of the probe during use causes flexing of the disc assembly so as to damp the vibration.

9 Claims, 3 Drawing Figures

PROBE ASSEMBLIES INCLUDING SUCH MOUNTS

BACKGROUND TO THE INVENTION

This invention relates to mounts for probes and to probe assemblies including such mounts.

The invention is more particularly concerned with stress-relieving 5 mounts such as for fluid-gauging probes.

The level of fuel and other dielectric fluids, such as lubricants, in aircraft may be measured by means of a capacitance probe comprising an outer tubular electrode and an inner coaxial rod electrode. The probe is mounted to extend vertically in a tank or reservoir such that fluid fills the outer electrode to the same height as fluid in the tank. As the fluid level in the tank or reservoir changes, therefore, a corresponding change in the level of fluid in the outer electrode is produced which causes a change in the value of capacitance between the two electrodes. By measuring the capacitance, the fluid level can be determined.

The length of the probe used is dictated by the size and shape of the tank or reservoir and can by up to about 800 mm long. The probe is usually secured at its upper end to an opening in a wall of the tank through which electrical connection of the probe is made. With probes of short length, it may be sufficient to mount them at the upper end only. With longer probes, however, it has formerly been necessary also to support them close to their lower end since the vibration and accleration to which they can be subjected leads to stress in the mount and the probe itself which can lead to breakage or damage to the probe. In many tanks or reservoirs, however, it is difficult to provide a mount at the lower end of the probe. This is especially the case where the tank or reservoir is of a flexible elastomeric construction. The provision of a mount at the lower end of the probe, furthermore, can require a hole to be cut through the floor of the tank or reservoirs consequently giving a site of weakness and possible leakage, and adding to the cost of installing the fuel probe.

BRIEF SUMMARY OF THE INVENTION

It is an object of the present invention to provide a mount for a probe, and a probe assembly including such a mount, by which stress in the probe can be relieved and the need for support at both ends can be obviated.

According to the present invention there is provided a mount for supporting a probe in a reservoir, the mount including a plurality of discs arranged in an axial configuration, each disc having a central region arranged to be joined securely with one end of the probe and an outer edge arranged to be joined securely with the reservoir such that displacement of the probe relative to the reservoir is accommodated by flexing of the discs.

The discs preferably each have a central aperture therethrough. The discs may be joined with one another centrally and around their respective outer edges and may be spaced from one another to define an annular recess therebetween which is preferably empty.

The ratio of the estimated disc stress to the disc material proof stress, and the ratio of the estimated probe stress to the probe material proof stress, are both preferably low and substantially the same. The discs may be of a metal such as stainless steel.

The discs may be secured to the probe by a means of a bolt that passes through the discs, and a nut that clamps the discs to the probe. The discs may be located in a sleeve and the outer edges of the discs clamped by a collar that is screwed into the sleeve.

Electrical connection of the probe may be established by means of an electrical cable that extends through the bolt.

According to another aspect of the present invention there is provided a probe assembly including a probe and a mount according to the above one aspect of the present invention.

According to a further aspect of the present invention there is provided a probe assembly including a capacitive level probe for measuring the level of fluid contents in a reservoir, and a mount for supporting the probe for immersion in the contents of the reservoir, the mount including a plurality of discs arranged in an axial configuration, and each disc having a central region joined securely with one end of the probe and an outer edge arranged to be joined securely with the reservoir such that displacement of the probe relative to the reservoir is accommodated by flexing of the discs.

A capacitive fuel-gauging probe assembly for an aircraft including a mount according to the present invention, will now be described, by way of example, with reference to the accompanying drawings.

DETAILED DESCRIPTION

Figure 1:
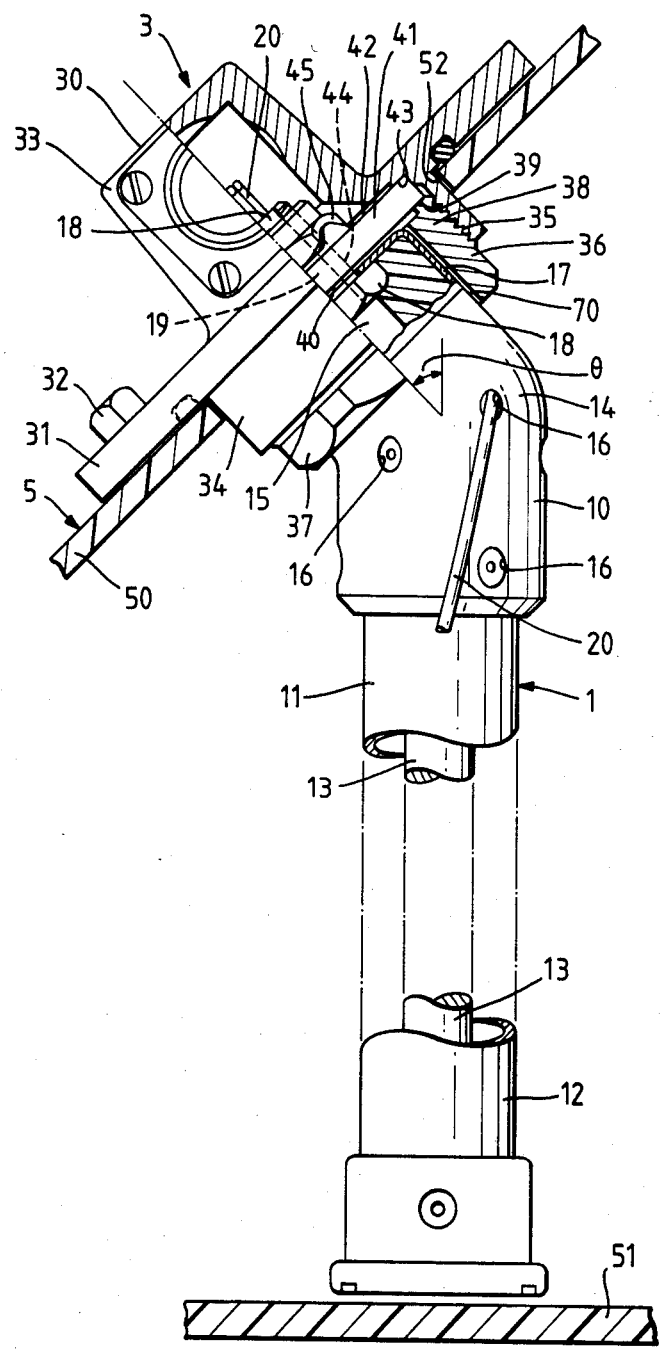
FIG. 1 is a partly sectional side elevation of the probe assembly mounted in a fuel tank.

The fuel-gauging probe assembly comprises a probe 1, that extends vertically in a fuel tank or reservoir 5, and a stress-relieving mount 3 by which the probe is secured at its upper end 10 to a wall 50 of the tank or reservoir.

The probe 1 has an outer tubular electrode 11 of aluminum that is open at the lower end 12 of the probe so that it is filled with fuel to the same height as fuel in the tank 5. An inner electrode 13 extends coaxially within the outer electrode 11 being separated from it by an air gap that is filled or emptied as the level of fuel changes thereby changing the capacitance between the two electrodes. The fuel level is measured in the usual way by measuring the capacitance between the two electrodes 11 and 13. The lower end 12 of the probe 1 is closely spaced from the floor 51 of the tank 5 but need not be supported.

At the upper end 10, the probe 1 has a plastic elbow 14, the angle $\theta$ of which is selected according to the inclination of the tank wall 50 to which the probe is mounted, such that the probe extends vertically over the major part of its length. The elbow 14 has a bore 15 therethrough which opens through small apertures 16 in the side of the elbow 14. A metal cap 17 is secured over the upper end of the elbow 14 and retains a threaded bolt 18 projecting axially from the elbow. The bolt 18 has a bore 19 therethrough in communication with the bore 15 and through which electrical cables 20 extend from the electrodes 11 and 13 via the apertures 16.

The mount 3 comprises an outer steel unit 30 with a radially extending flange 31. The inner face of the flange 31 lies against the external face of the wall 50 of the tank 5 and is secured to the tank by bolts 32. The unit 30 has a hollow cup-shape projection 33 centrally on the outer face of the flange 31, through which the cables 20 emerge from the probe assembly. An integral sleeve 34 projects from the inner face of the flange 31, coaxially of the mount 3, through an opening 52 in the wall 50 of the tank 5. The inner surface 35 of the sleeve 34 is screw threaded and receives, threaded into it, a circular aluminum collar 36 with a hexagonal external surface 37 at one end. The collar 36 embraces the upper end of the elbow 14 and is spaced from its outer surface by an annular gap 70. The other end 38 of the collar 36 is cut away on its inner surface to form a narrow peripheral ledge 39 which bears on the periphery of one face 40 of a stress-relieving disc assembly 41, which is described in more detail below. The periphery of the other face 42 of the disc assembly 41 bears on a narrow circular ledge 43 within the unit 30.

The bolt 18 projects through a central aperture 44 in the disc assembly 41 and is secured to it by means of a nut 45 threaded onto the bolt on the opposite side of the disc assembly.

Figure 2:
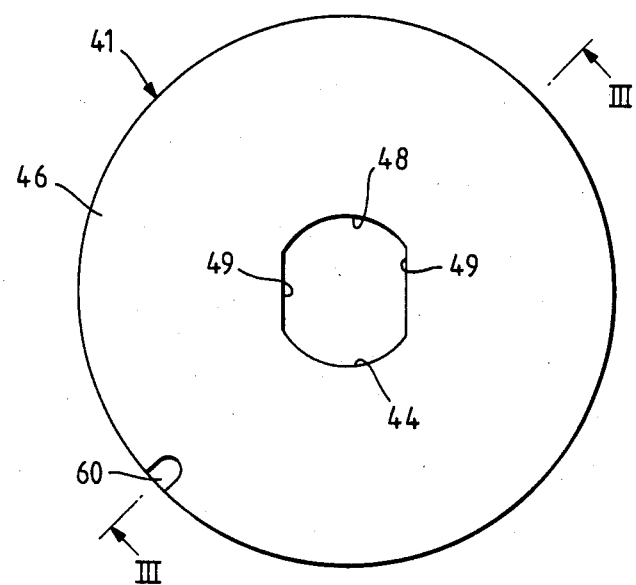
FIG. 2 is a plan view of a part of the mount of the probe assembly to a larger scale.
Figure 3:
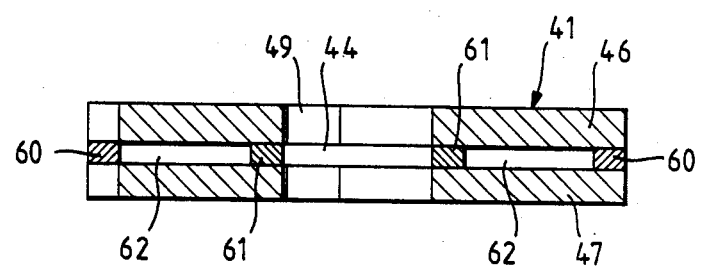
FIG. 3 is a cross-sectional side elevation of the part shown in FIG. 2 along the line III—III.

The disc assembly 41 is shown in more detail in FIGS. 2 and 3 and comprises two identical circular discs 46 and 47 made from a stainless steel that is heat-treatable, and that has a high strength and isochronous stress level. The discs 46 and 47 are of circular shape, being about 45 mm in diameter, and each has a central aperture 48 of substantially circular shape, being about 12 mm in diameter, with two parallel flats 49. The discs 46 and 47 are joined together around their outer edges and centrally around the edges of their apertures 48 with respective annular rings 60 and 61 made of the same material as the discs themselves. The rings 60 and 61 extend between the discs 46 and 47, being joined to them by brazing, and thereby separate the discs from one another by an annular recess 62 which is preferably empty. The overall thickness of the disc assembly 41 is about 5 mm with each disc 46 and 47 being about 2 mm thick and the recess 62 being about 1 mm thick.

The disc assembly 41 is clamped at its outer edge to the mount 3, and is clamped centrally to the upper end 10 of the probe 1. Any vibration or deflection of the probe 1 will be communicated to the disc assembly 41. The gap 70 between the collar 36 and the elbow 14 enables limited displacement of the probe 1 relative to the mount 3 which is accommodated by flexing of the disc assembly 41. Any vibration of the probe during use causes flexing of the disc assembly 41 which allows the vibrational energy to be absorbed in the disc assembly thereby damping the vibration.

"Q value", when used in reference to mechanical vibrating systems, is a measure of how long a vibration system will continue vibrating, i.e., it is an inverse measure of the damping of a vibrating system. A system with a high Q value is only lightly damped and will continue vibrating for a longer time than a system having a low Q value. The purpose of the mount of the present invention is to reduce the vibration of the probe, that is, to lower its Q value.

The thickness and separation of the discs 46 and 47 are selected according to the size, weight and angle of the probe with which disc assembly 41 is used, and the vibration to which the probe is likely to be subjected. The discs are chosen such that the ratio of the estimated probe stress to the probe material proof stress, and the estimated disc stress to the disc material proof stress are substantially the same and as small as possible. It is found that, in the final assembly, energy losses in the mount reduce the Q value of the probe. With, for example, a probe 823 mm long, the Q can be reduced from 41.24 when no stress-relieving disc assembly is used, to a value of about 25 with a suitable disc assembly.

A stress-relieving mount of this kind can thereby substantially reduce the wear, fatigue and damage to probes and their mountings especially where they are subject to high vibration and acceleration levels. The mounts also enable longer probes to be used without the need for any mount at their lower end.

Disc-assemblies may be made of different materials and may include more than two discs.

What we claim is:

1. A stress-relieving mount for supporting an elongate fluid-gauging probe in a fluid reservoir, said mount comprising: a plurality of discs, each disc having an aperture therethrough in a central region of the disc, and an outer edge; means securing said discs to one another centrally around said apertures; means securing said discs to one another around their respective outer edges; means securing the mount at the joined central regions of said discs solely with one end of said probe; and means securing the joined outer edges of the discs solely with a wall of the reservoir such that vibrational stresses of the probe are accommodated by deflection of the joined central regions of the discs relative to the outer edges of the discs.

2. A mount according to claim 1, including a bolt extending through said apertures and having an end secured with said probe, and a nut, screw threaded on said bolt and clamping said discs to the probe.

3. A mount according to claim 1, including a sleeve member and a collar member, wherein said collar member is screwed into the sleeve member, and wherein the said discs are located in said sleeve member and clamped around their outer edge by said collar member.

4. A stress-relieving mount for supporting an elongate fluid-gauging probe in a fluid reservoir, said mount comprising: a plurality of discs, each disc having a central region and an outer edge; means securing said discs to one another centrally; means securing said discs to one another around their respective outer edges; means spacing said discs from one another such as thereby to define an annular recess therebetween; means securing the mount at the joined central regions of said discs solely with one end of said probe; and means securing the joined outer edges of the discs solely with a wall of the reservoir such that vibrational stresses of the probe are accommodated by deflection of the central regions of the discs relative to the outer edges of the discs.

5. A stress-relieving mount for supporting an elongate fluid-gauging probe in a fluid reservoir, said mount comprising: a plurality of discs, each disc having a ratio of estimated disc stress to disc material proof stress selected to be as low as possible, and each disc having a central region and an outer edge; means securing said discs to one another centrally; means securing said discs to one another around their respective outer edges; means securing the mount at the joined central regions of said discs solely with one end of said probe; and means securing the joined outer edges of the discs solely with a wall of the reservoir such that vibrational stresses of the probe are accommodated by deflection of the central region of the mount relative to the outer edge of the mount.

6. A stress-relieving mount for supporting an elongate fluid-gauging probe in a fluid reservoir, the probe having a ratio of estimated probe stress to probe material proof stress selected to be as low as possible, and said mount comprising: a plurality of discs, each disc having a central region and an outer edge; means securing said discs to one another centrally; means securing said discs to one another around their respective outer edges; means securing the mount around said central apertures solely with one end of said probe; and means securing the joined outer edges of the discs solely with a wall of the reservoir such that vibrational stresses of the probe are accommodated by deflection of the central region of the mount relative to the outer edge of the mount.

7. A stress-relieving mount for supporting an elongate fluid-gauging probe in a fluid reservoir, said mount comprising: a plurality of discs, each disc having a ratio of estimated disc stress to disc material proof stress selected to be substantially the same as the ratio of estimated probe stress to probe material proof stress, and each disc having a central region and an outer edge; means securing said discs to one another centrally ; means securing said discs to one another around their respective outer edges; means securing the mount at the central regions of the discs solely with one end of said probe; and means securing the joined outer edges of the discs solely with a wall of the reservoir such that vibrational stresses of the probe are accommodated by deflection of the central region of the mount relative to the outer edge of the mount.

8. A stress relieving mount for supporting an elongate fluid-gauging probe in a fluid reservoir, said mount comprising: first and second discs, each disc having a central aperture therethrough and an outer edge; spacer means securing said discs to one another centrally around said apertures and around the respective outer edges of said discs such as space said discs from one another axially and to define an annular recess therebetween; means securing the mount around the central apertures of said discs solely with one end of said probe; and means securing the joined outer edges of the discs solely with a wall of the reservoir such that vibrational stresses of the probe are accommodated by deflection of the central region of the mount relative to the outer edge of the mount.

9. A probe assembly comprising an elongate fluid-gauging probe and a stress-relieving mount for supporting the probe in a fluid reservoir, said mount comprising: first and second discs, each disc having a central aperture therethrough and an outer edge; first spacer means securing said discs to one another centrally around said apertures; second spacer means securing said discs to one another around their respective outer edges, said first and second spacer means spacing said discs from one another axially and defining an annular recess between said discs; means securing the mount around the central apertures of said discs solely with one end of said probe; and means securing the joined outer edges of the discs solely with a wall of the reservoir such that vibrational stresses of the probe are accommodated by deflection of the central region of the mount relative to the outer edge of the mount.

* * * * *